United States Patent [19]

Bradshaw

[11] 3,831,008

[45] Aug. 20, 1974

[54] ELECTRICAL INFORMATION RECOGNITION AND RETRIEVAL

[75] Inventor: Randolph F. Bradshaw, Willoughby, Ohio

[73] Assignee: Addressograph-Multigraph Corporation, Cleveland, Ohio

[22] Filed: Feb. 14, 1973

[21] Appl. No.: 332,478

[52] U.S. Cl. ..................... 235/61.11 H, 235/61.7 B

[51] Int. Cl. ............................................ G06k 7/08

[58] Field of Search... 235/61.11 H, 61.7 B, 61.6 A, 235/61.6 B; 340/149 A, 173 R

[56] References Cited

UNITED STATES PATENTS

| | | | |
|---|---|---|---|
| 3,043,505 | 7/1962 | Brown | 235/61.11 H |
| 3,044,694 | 7/1962 | Davidson et al. | 235/61.11 H |
| 3,132,242 | 5/1964 | Cutaia | 235/61.11 H |

*Primary Examiner*—Daryl W. Cook
*Attorney, Agent, or Firm*—Ray S. Pyle

[57] ABSTRACT

Apparatus and method for reading an information carrying member, such as an embossed credit card or the like, wherein information is defined on one side of the member by surface level transitions from a reference level. An electric potential is established on the one side, as by an electric surface charge. An electrically conductive probe scans a path over the one side such that a characteristic current is caused to flow in the probe as it traverses past a surface level transition. The characteristic current is binary in that it exhibits first and second binary levels as the probe respectively traverses past surface level transitions in a first direction and a second direction relative to the probe. The binary levels of the characteristic current are utilized for providing an output as to the information represented by the surface level transitions.

19 Claims, 10 Drawing Figures

ELECTRICAL INFORMATION RECOGNITION AND RETRIEVAL

BACKGROUND OF THE INVENTION

This invention relates to the art of information recognition and retrieval and, more particularly, to apparatus and method for electrically reading an information carrying member having information defined by surface level transitions from a reference level.

The invention is particularly applicable for reading information in the form of surface level transitions from a reference level on a relatively flat information carrying member, such as a plastic credit card, or the like, and the invention will be described with particular reference thereto; although, the invention may be employed for reading information in the form of surface level transitions from a uniformly curved reference surface, such as that provided by a cylinder.

As is well known, a typical credit card is a small, wallet size, relatively flat, plastic member and has information carried thereon in the form of raised surface areas, which may be embossed, providing alphanumeric characters. The information on such cards is frequently retrieved by a mechanical reader which employs such a card as a printing plate for purposes of making an inked impression on one or more sheets of paper. These paper sheets provide a customer receipt and a record for the vendor for use in preparing customer bills and the like.

Whereas such mechanical information retrieving systems are still in demand they do not readily lend themselves to situations wherein it is desired to more rapidly or automatically recognize and extract the infromation so that it may be processed, as with the use of a digital computer in an information handling system. Both magnetic and optical information reading systems have been proposed for automatically retrieving information from information carrying members. However, such systems have required that alterations be made to the typical credit card. For example, in a magnetic reading system, a special strip of magnetic material may be secured to the card and coded, nonvisible magnetized portions thereof are magnetically sensed and decoded. Optical reading systems have employed codes made up of a pattern of optical marks in the form of light reflective and nonreflective codes, or a series of punched out coded areas. Consequently, such optical or magnetic information reading systems require special credit cards and cannot be used for retrieving information from a credit card having only alphanumeric characters formed thereon as raised surfaces.

There are, however, proposals which have been made for optically reading raised characters. Such systems have, however, depended for their accuracy on such factors as light reflectivity and character height. To the extent that these factors are not properly considered in the design of a credit card or other information carrying member, the noise to signal ratio may be quite high, requiring complex circuitry to properly decode the information obtained from the sensors.

SUMMARY OF THE INVENTION

The present invention contemplates that the information carrying members to be read in accordance with the invention need not exhibit specific reflectivity characteristics or be altered in appearance or construction, as in the case of the information carrying members which are read magnetically or optically as described hereinabove. The invention does contemplate that the information carrying members have information thereon defined by surface level transitions from a reference surface level. These level transitions may be defined by, for example, raised surface areas or indented surface areas, or apertures and the like.

It is therefore a primary object of the present invention to extract information from information carrying members having information defined by level transistions from a reference level in such a manner that there is no requirement for the information member to be specifically constructed, as by having magnetic or optical markings thereon.

It is a still further object of the present invention to extract information from an information carrying member which does not require mechanical feelers or optical readers or magnetic readers.

It is a still further object of the present invention to extract information from information carrying members by electrical detection as distinguished from magnetic or optical detection.

It is a still further object of the present invention to provide apparatus and method for electrostatically reading information on an information carrying member where the information is defined by surface level transitions from a reference level.

In accordance with the present invention, both apparatus and method are provided for reading an information carrying member having information on at least one side thereof by surface level transitions from a reference surface on the one side of the member. An electric potential is established on at least a portion of the reference surface of the member. An electrically conductive probe is positioned proximate to, but spaced from, the reference surface. Relative movement is effected between the probe and the information carrying member such that the probe scans along a path spaced from the reference surface. A characteristic current is caused to flow in the probe as the probe scans past a surface level transition. This characteristic current is utilized for providing an output indication as to the information represented by the detected surface level transition.

In accordance with a more limited aspect of the present invention, the electric potential established on the reference surface is accomplished by establishing an electric charge thereon.

The foregoing and other objects and advantages of the invention will become more readily appreciated from the following description of the preferred embodiments of the invention as taken in conjunction with the accompanying drawings.

DESCRIPTION OF THE PREFERRED EMBODIMENT

Figure 1:
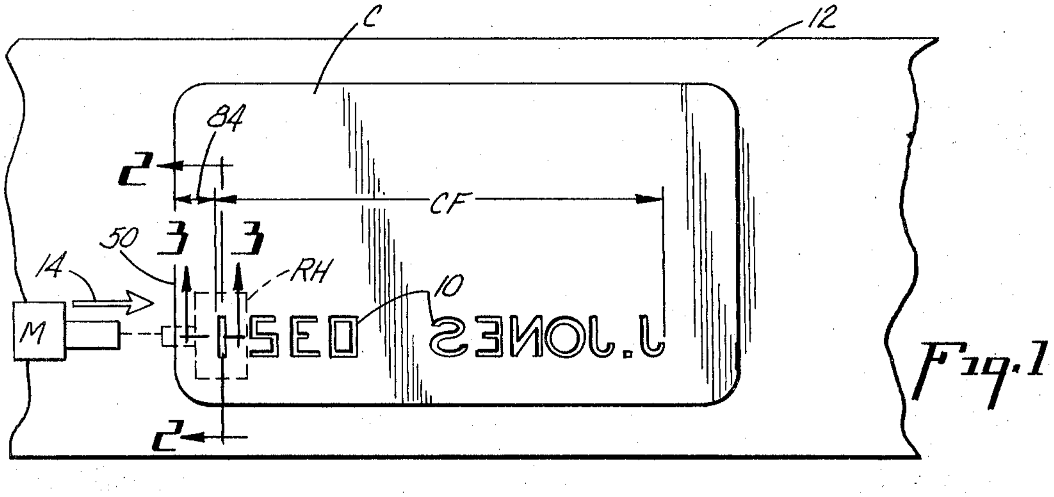
FIG. 1 is a plan view illustrating an electrostatic reader, constructed in accordance with the present invention, for reading an information carrying member.
Figure 2:
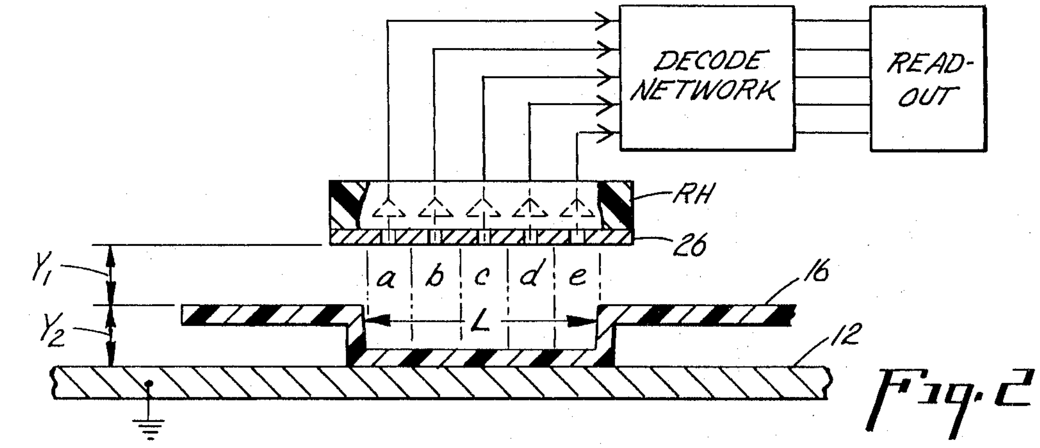
FIG. 2 is an enlarged sectional view taken generally along line 2—2 looking in the direction of the arrows in FIG. 1.
Figure 3:
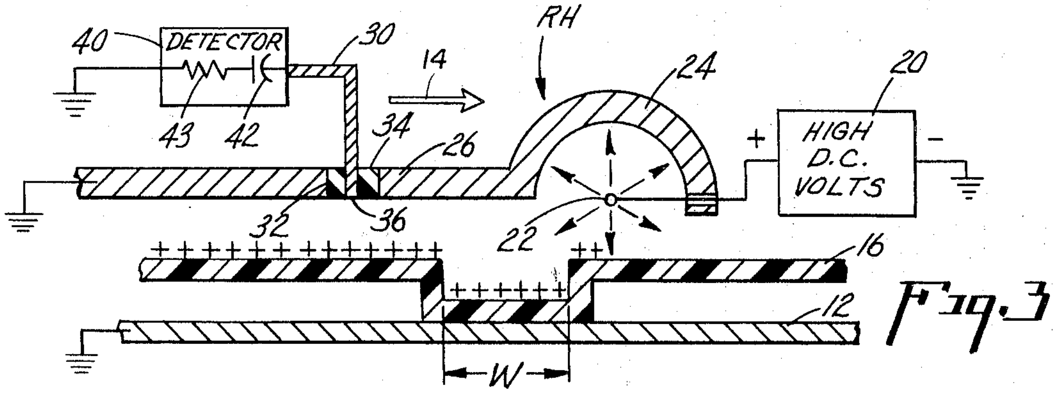
FIG. 3 is an enlarged sectional view taken generally along line 3—3 in FIG. 1 and looking in the direction of the arrows in FIG. 1.

Referring now to the drawings, wherein the showings are for purposes of illustrating preferred embodiments of the invention only and not for purposes of limiting same, FIGS. 1, 2 and 3 illustrate apparatus constructed in accordance with the invention for extracting information from an information carrying member and which is illustrated in this embodiment of the invention as a flat card C. Card C is preferably constructed of a dielectric material such as plastic, and, consequently, the card may take the form of a typical wallet size credit card. Card C carries information in the form of alphanumeric characters which may, for example, be indicative of the owner of the card to be extracted for billing purposes. The characters may be defined by outlines of apertures, punched or otherwise suitably formed in the card. Alternatively, the characters may be formed by raised or recessed surface areas which appear only on one side of the card. In the illustrated embodiment, card C has a pattern of alphanumeric characters 10 formed by surface area portions which are offset from adjacent surface area portions and the offset portions extend through the card. This construction may be accomplished by embossing the card with a suitable embossing die. Hence, the information provided by the character pattern is detectable by vision and by touch on both sides of the card. The above described cards all exhibit a common characteristic; to wit, that at least the outline of a character is defined by a surface level transition from a reference surface and it is this characteristic that is employed by the present invention for extracting the information from the card.

The information on card C is read by scanning the card with a read head which may be positioned to scan either the front or back surface of the card. In the embodiment illustrated the card is positioned face down so that the tops of the characters rest upon an electrically conductive support plate 12. A read head RH is positioned to scan the character pattern 10. The scanning requires relative movement between the card and the read head and either or both may be moved. In the embodiment illustrated, card C is maintained stationary and read head RH is displaced as with a suitable motor M in the direction indicated by arrow 14. The read head RH is spaced slightly above the relatively flat rear surface 16 of card C with the positioning of the read head being approximately the same height $Y_1$ above the surface 16 as is height $Y_2$ of surface 16 above the upper surface of plate 12. As viewed from the back surface 16, each character such as the character "1" in FIG. 1, has a maximum height or length L. For character recognition purposes length L may be divided into five zones *a*, *b*, *c*, *d* and *e*, as shown in FIG. 2, and the read head RH employs five sensors for respectively monitoring these zones.

As schematically illustrated in FIG. 3, the read head includes an electric charging portion and a sensing portion. The charging portion includes a corona charger, of conventional design, for bombarding the back surface 16 with positive ions. As is conventional, such a corona charger includes a high DC voltage source 20, such as on the order of 10,000 volts, connected between ground and one end of a fine wire 22 from which positive ions are emitted. A conductive shield 24 is located above wire 22. Wire 22 is located above surface 16 by essentially distance $Y_1$ (see FIG. 2) and has a length, in the direction normal to the paper in FIG. 3, equal to or greater than character length L.

As the read head RH is driven by motor M in the direction indicated by arrow 14 some of the positive ions emitted from wire 22 are directed in a downward direction to bombard the back surface 16 of card C thereby establishing an electric surface charge on the card so long as the card is constructed of electrically resistive material, such as a dielectric. Support plate 12 is connected to a reference electric potential, such as ground potential, and provides a potential reference for use in detection. The shield 24 terminates in an electrically conductive ground plate 26 having its level surface spaced by a distance $Y_1$ above card surface 16.

The read head RH employs five sensors for respectively monitoring zones *a*, *b*, *c*, *d* and *e* along the length or height L of each character (see FIG. 2). As shown in FIG. 3, each sensor includes a probe 30 having an end or tip 36 extending through an aperture 32 in the ground plane 26 and secured thereto as by a suitable insulator 34. The probe tip 36 is essentially flush with the lower surface of the ground plane so that it is exposed to the electric field established between the ground plane and rear surface 16 of card C. The other end of the probe 30 is electrically connected to a detector 40. Detector 40 may be looked upon as being an RC circuit including a capacitor 42 and a resistor 43 connected in series between probe 30 and ground. Probe 30 is preferably constructed so that the diameter of tip 36 is less than the width W of the narrowest character recess, such as that provided by character "1", to be examined. For example, if the width W of the narrowest recess is on the order of 0.040 inches, then probe tip 36 may have a diameter on the order of 0.028 inches. In such an arrangement, heights $Y_1$ and $Y_2$ may each be on the order of 0.040 inches.

Figure 4:
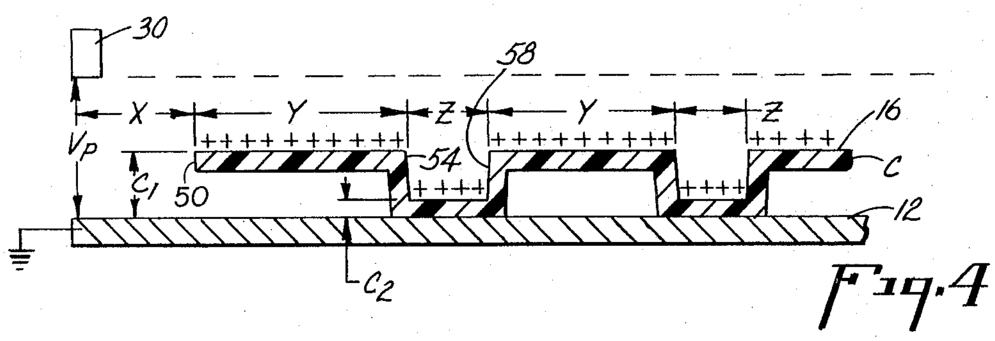
FIG. 4 is a view similar to that of FIG. 3 for illustrating the operation of the invention.
Figure 5:
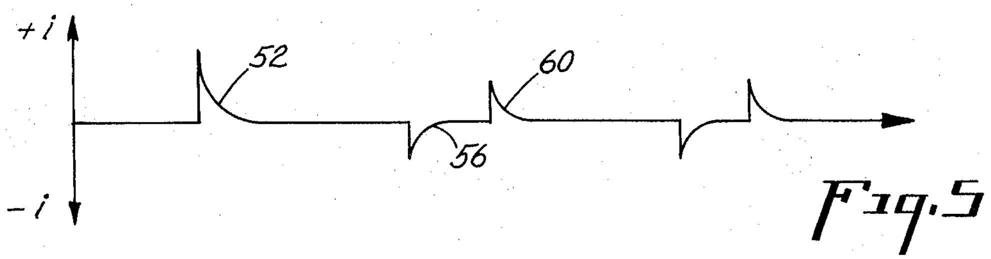
FIG. 5 is a graphical illustration showing current spikes as a function of time during the operation shown in FIG. 4.

Apparatus constructed as shown in FIG. 3 has been tested and it has been determined that a characteristic current is caused to flow in the probe as it traverses past surface level transitions on the charged side of card C. This characteristic current is binary in that it exhibits a first polarity as the probe traverses past a surface level transition in one direction and of an opposite polarity as the probe traverses past a surface level transition in the opposite direction. The test is represented by FIGS. 4 and 5 to which reference is now made. As probe 30 traversed past the lead edge 50 of card C, a characteristic current flowed in the probe, and this was observed with an oscilloscope. The characteristic current exhibits a first binary level and is represented as positive current spike 52 in FIG. 5. As probe 30 then traversed over the first surface level transition 54, a characteristic current was observed and it exhibited an opposite binary level, as represented by the negative current spike 56 in the waveform of FIG. 5. Thereafter as the probe 30 traversed past the second surface level transition 58, a characteristic current was observed as exhibiting an opposite characteristic from that which occurred when the probe passed over the first surface level transition 54. This characteristic current is illustrated in FIG. 5 as a positive current spike 60.

It is believed that there are alternative explanations as to the reason for the binary nature of the characteristic current in probe 30 as the probe traverses over card C. The following description is presented for purposes of explaining the technical theory involved, as the invention is presently understood. Referring again to FIG. 4, a capacitor $C_1$ is defined between support plate 12 and the charged surface 16 of card C. This capacitor includes the thickness of card C as well as the air gap between the card and the upper surface of support plate 12. A second capacitor $C_2$ is defined between the upper surface of plate 12 and the recessed level of surface 16. This capacitor also includes the thickness of the card together with air existing between the plate and the card. Since the air gap portion of capacitor $C_1$ is substantially greater than that of capacitor $C_2$, then capacitor $C_1$ exhibits a capacitance which is substantially less than that of capacitor $C_2$.

In this explanation, it is assumed that the surface charge Q is evenly distributed on surface 16. Probe 30 responds to the potential difference between the grounded support plate 12 and the card surface 16. This potential may be considered as the probe votlage $V_p$. The capcitance between the upper surface of the card and the probe tip is believed to be quite small due to the narrow diameter of the probe tip. Consequently, this capacitance is substantially smaller than that of capacitor $C_1$ or $C_2$ and does not contribute materially to the changes noted as the probe traverses over the charged card. While the probe is traversing over the charged card, it scans through three zones *x*, *y* and *z*. In zone *x*, the zone which takes place before the probe tip reaches the leading edge 50 of the card, the probe potential $V_p$ is essentially zero. In zone *y*, taken from the leading edge 50 to the first negative surface level transition 54, the probe potential $V_p$ is high due to the constant charge Q and the low value of capacitor $C_1$. In zone *z*, capacitor $C_2$ presents a higher capacitance than that of capacitor $C_1$ and, hence, the potential is substantially lower than that in zone *y*.

Figure 6:
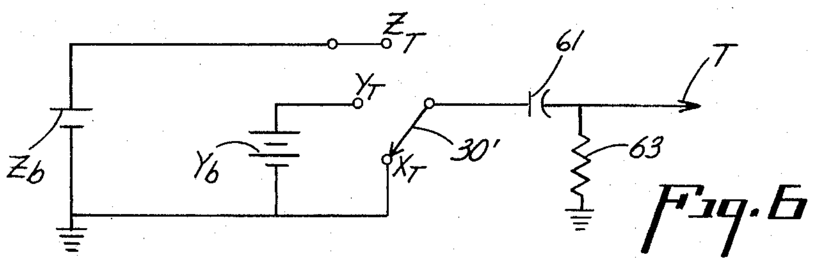
FIG. 6 is a schematic representation of the detector operation.

In FIG. 6 a schematic illustration is presented of a representative circuit of the detection operation. Probe 30 is represented as a movable switch contact 30′ which may be selectively connected to terminals $X_t$, $Y_t$ and $Z_t$. The potential at terminal $X_t$ is essentially that of ground potential, whereas the potential at $Y_t$ is that of a representative battery $Y_b$ and the potential at terminal $Z_t$ is that of a representative battery $Z_b$. Battery $Y_b$ provides a higher potential than that of battery $Z_b$. Batteries $Y_b$ and $Z_b$ represent the probe voltage $V_p$ in zones Y and z, respectively, and take into consideration the effects of capacitors $C_1$ and $C_2$. Other effective capacitance in the circuitry may be represented by a capacitor 61 and the effective resistance in the circuit may be represented by resistor 63. The capacitance of the circuit and the effective capacitor 61 and the effective resistor 63 provide an RC time constant and, hence, the transient responses shown in the waveforms of FIG. 5. As switch 30′ is toggled between terminals $X_t$, $Y_t$ and $Z_t$ the current at terminal T exhibits spikes, as shown in the waveforms of FIG. 5. The current spike 52 is of a substantially greater magnitude than that of either spike 56 or 60 due to the initial capacitor charging effect. Current spike 56 represents a capacitor charge change to a lower level and current spike 60 represents a capacitor charge change back to the higher level.

Figure 7:
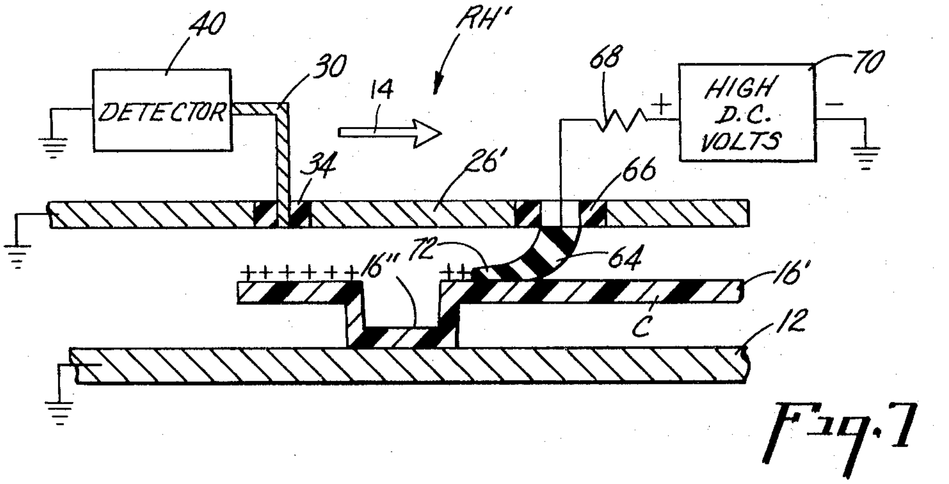
FIG. 7 is a view similar to that of FIG. 4 and illustrating another embodiment of the electric charger.

In FIG. 7 there is schematically illustrated a modified read head RH′ constructed in accordance with the invention. This read head, like that shown in FIG. 3, employs a probe 30 mounted to a ground plane 26′ with a suitable insulator 34. In this embodiment of the invention, a surface charge is placed only on the unrecessed surface 16′ and no charge is placed on the recessed surface 16″. This is accomplished by wiping surface 16′ with a resilient charge member 64 secured at one end to ground plane 26′, as with an O-ring insulator 66. The charge member 64 is constructed of conductive rubber, such as a mixture of black rubber with a carbon base. The mounted end of the member 64 is electrically connected through a current limiting resistor 68 to a high DC voltage source 70, which may be on the order of 10,000 volts. Member 64 is pressed against card C so that a trailing portion 72 of the member rubs against surface 16′ as the read head RH′ is traversed over the card. Thus, substantial surface area contact is made between the trailing portion 72 and surface 16′ so that a transfer charge takes place onto surface 16′ where the surface contact was made. Consequently, a disparity in surface charge exists between the surface 16′ and the recessed surface 16″. The theory of operation presented with respect to FIGS. 4, 5 and 6 may be employed in explaining the operation of the embodiment of FIG. 7. One exception, however, is that in the operation of FIG. 7, there is no surface charge in recess 16″. Consequently, terminal $Z_t$ in FIG. 6 presents a ground potential, in the same sense as does terminal $X_t$, and battery $Z_b$ is short-circuited. Since the intelligence to be obtained by probe 30 relates to surface level transitions, the disparity of surface charge in the embodiment of FIG. 7 will tend to increase the signal to noise ratio and, hence, increase the reliability of the extracted information.

Figure 9A:
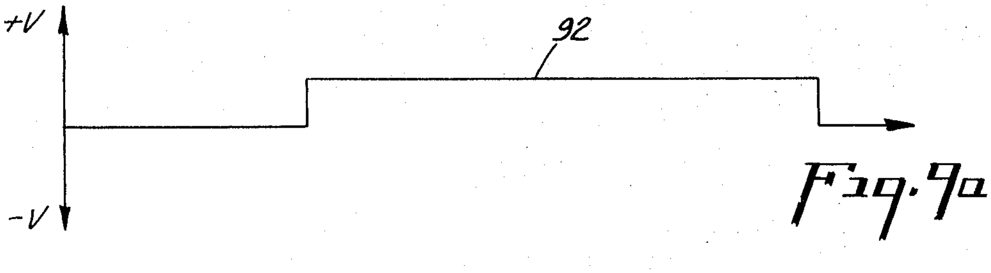
Figure 9B:
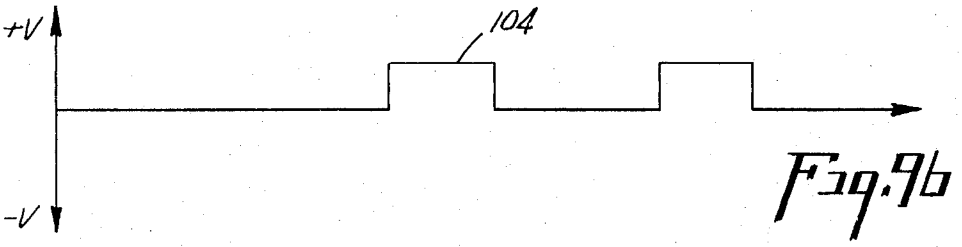
Figure 8:
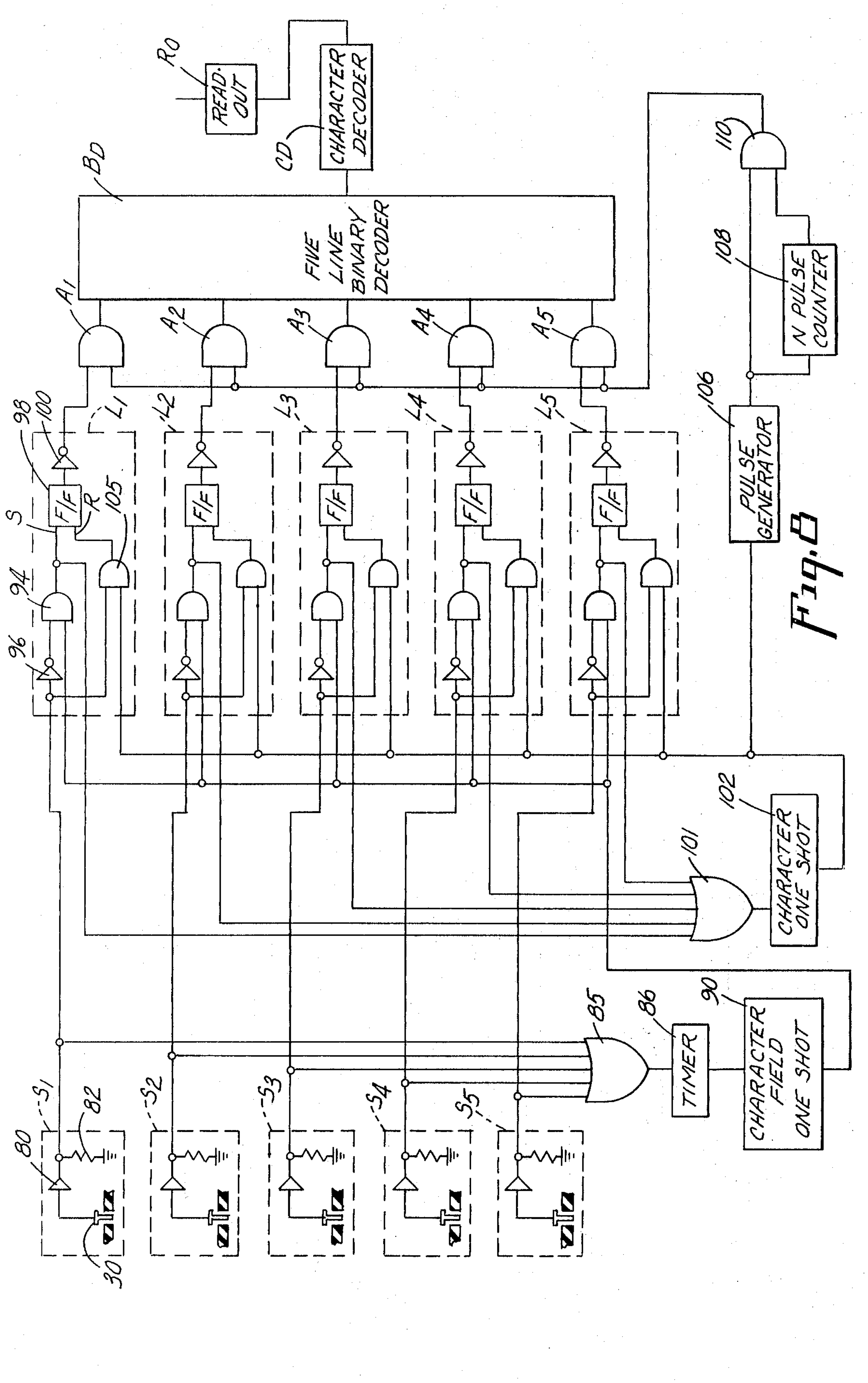
FIG. 8 is a combined schematic-block diagram illustration of the detector circuitry employed in the invention; and, FIGS. 9A and 9B are graphical illustrations of voltage versus time waveforms and are used in explaining the operation of the circuit shown in FIG. 8.

Having now described the principles of the invention, attention is now directed to the detector circuitry of FIG. 8 and the waveforms of FIGS. 9A and 9B. As discussed with reference to FIG. 2 the read head RH employs five detectors each having a probe 30 mounted on the ground plane 26 in the manner described hereinabove with reference to FIG. 3. The five sensors may be schematically represented as sensors S1, S2, S3, S4 and S5 for respectively monitoring zones *a*, *b*, *c*, *d*, and *e* (see FIG. 2). As is shown with respect to sensor S1, each of the five sensors employs a probe 30 connected to the input circuit of a current amplifier 80 having a load resistor 82 connected between its output circuit and ground. Current amplifier 80 may employ a high input impedance, field effect transistor; although, other forms of current amplifiers may be used. The load resistor 82 in each sensor serves to provide positive and negative voltage pulses, which are respectively referred herein to as binary "1" and binary "0" signals, in dependence upon whether the current caused to flow in probe 30 is positive, such as spike 52, or negative, such as spike 56.

The output signals obtained from the load resistors 82 of sensors S1 through S5 are respectively applied to logic circuits L1, L2, L3, L4 and L5. The logic circuits L1 through L5 serve to interpret the binary nature of the current caused to flow in the probes as the sensors simultaneously monitor zones a through e respectively. The output signals taken from the logic circuits are also binary and are applied through gated AND gates A1 through A5 at specific points in time, to be described hereinafter, and then applied to a five line binary decoder circuit BD. As will be developed hereinafter, each character is examined, a number of times such as five times, to determine the identity of the character in the monitored area. This is the purpose of gating AND gates A1 through A5 at different points in time. Binary information obtained from the AND gates, as interpreted by the binary decoder BD, is decoded for character content by a character decoder CD which then applies this information to a suitable readout RO.

As the read head traverses over card C the lead edge 50 is detected substantially simultaneously be sensors S1 through S5 and a characteristic current, as represented by positive current spike 52 in FIG. 5, is caused to flow in each probe 30. This information is used to activate the logic circuitry so that it interprets information obtained from the sensors only for a time duration corresponding with the length of the character field CF (see FIG. 1) on card C. Thus, a typical card may have a character field of a maximum length CF which commences at a point located a distance 84 from the leading edge 50. (See FIG. 1). By activating the logic circuitry only during the time the probe passes over the character field CF, there results a greater improved signal to noise ratio and, hence, reliability in decoding information obtained from the card. To achieve this, the first positive or binary "1" signal obtained from one of the sensors S1 to S5 actuates a timer 86, by means of OR gate 85 which times a delay period corresponding with distance 84 and then actuates a character filed one-shot circuit 90. This circuit may take the form of a conventional monostable oscillator which upon receipt of a binary "1" signal from times X serves to provide a positive or binary "1" enabling signal, as represented by waveform 92 in FIG. 9A, for a fixed period of time corresponding with the length of the character field CF. This binary "1" signal service to enable an AND gate 94 located in each of the logic circuits L1 through L5. The logic circuits are now activated and will serve to provide output binary signals in dependence upon the direction of surface level transitions of the characters being scanned.

The first surface level transition is the leading edge of the first character or a negative surface level transition corresponding with transition 54, illustrated in FIG. 4. Load resistor 82 of the associated sensor will provide a binary "0" signal corresponding with the negative current spike 56 in FIG. 5. This signal is inverted by an inverter amplifier 96 in the associated logic circuit to provide a second binary "1" signal for application to the previously enabled AND gate 94. Consequently, AND gate 94 applies a binary "1" signal to the set input S of an RS flip-flop 98 causing the output of the flip-flop to be lowered from its normal high binary "1" level to its low binary "0" level. Flip-flop 98 remains in this low level status until it is reset by application of a binary "1" signal to its reset input R. During the time that the flip-flop is in its set condition its binary "0" output signal is inverted by an inverter amplifier 100 so that a binary "1" signal is provided to enable the associated AND gate A1 through A5, respectively. This is indicative that a character leading edge to wit, the negative level transition 54, has been detected (See FIG. 4).

At the time that surface level transition 54 was detected (See FIG. 4), AND gates 94 also applied binary "1" signals to OR gate 101 and in turn actuate a character one-shot circuit 102. This circuit, like the character field one-shot circuit 90, may take the form of a conventional monostable oscillator which serves, upon receipt of a positive or binary "1" signal, to provide a positive output signal for a fixed time duration. This time duration corresponds with the maximum width of a character that may be detected on card C. The output signal is indicated by the waveform 104 in FIG. 9B. This binary "1" signal obtained from the character one-shot circuit 102 serves to enable AND gate 105, having its output connected to the reset input R of flip-flop 98, as well as to enable a pulse generator 106. This actuates the pulse generator to supply a pulse train to an N pulse counter 108 as well as to an AND gate 110. The N pulse counter serves, upon receipt of the first pulse from the pulse generator, to provide an enabling binary "1" signal to one input of AND gate 110 and this will continue until N pulses have been counted. Thus, N pulses are passed by AND gate 110 and applied to the second input each of AND gates A1 through A5. For purposes of illustration, N may equal 5 so that five pulses are used to permit examination of each character at five points in time. Each time a pulse is applied from AND gate 110 and AND gates A1 through A5 a check is made by these AND gates to determine whether a binary "1" signal is provided by any or all of the logic circuits L1 through L5. This information, as binary signals, is then applied by the AND gates to the five line binary decoder BD. This is done five times for each character during the period timed by the first enabled character one-shot circuit 102. Consequently, each character is simultaneously sensed at five different places or zones *a*, *b*, *c*, *d* and *e* (see FIG. 2) and at five different points in time. The information is decoded by the binary decoder BD and interpreted by the character decoder CD as a particular character. This is then suitably indicated by a readout RO, of conventional design.

Each flip-flop 98 in the logic circuits L1 through L5 is reset when a binary "1" signal is applied to its associated reset input R. In the case of logic circuit L1, shown in FIG. 8, the trailing edge of the character slot being examined, such as surface level transition 58, is in an opposite direction from the leading edge and, hence, causes a characteristic current of an opposite nature to flow in the associated probe 30. This is transmitted to the logic circuit as a binary "1" signal corresponding with the positive current spike 60 illustrated in FIG. 5. The binary "1" signal is applied to the already enabled AND gate 105 which now applies a binary "1" signal to the reset input of flip-flop 98. This causes the output circuit of the flip-flop to return to its normal high, or binary "1" state, and thereby remove the binary "1" signal from the output circuit of the logic circuit L1.

The invention has been described in conjunction with corona charger spaced from the card, as is shown in FIG. 3, and a surface charger for establishing a surface charge only on the unrecessed surface 16', as shown in FIG. 7. The invention contemplates that other systems be employed for establishing a charge on the card. For example, the surface charge on surface 16 of the embodiment of FIG. 3 may exhibit a more uniformly constant charge level if corona chargers be employed on opposite sides of the card. Also, instead of the conductive rubber member 64 of FIG. 7, a triboelectric process of establishing a surface charge may be employed.

It is also contemplated that the potential to be established on an information carrying member may be obtained by coating the surface with an electrically conductive medium and then connecting a source of direct current voltage between a supporting ground plane, such as support member 12, and a conductive material on the non-supported surface, such as surface 16 of card C. Traversing such a surface with a conductive probe, such as probe 30, would provide characteristic current similar to that as represented by current spikes 52, 56 and 60 shown in the wave forms of FIG. 5.

Other modifications may be made beyond those described hereinabove within the spirit and scope of the invention, as defined by the appended claims.

What is claimed is:

1. Apparatus for electrically reading an information carrying member having information on at least one side thereof and defined by surface level transitions from a reference surface on said one side and comprising:

electrical means for establishing a flow of current to set up an electric potential on said reference surface;

electrically conductive probe means positioned proximate to and spaced from said reference surface;

means for imparting relative movement between said probe means and said member such that said probe means scans along a path spaced from said reference surface so that a characteristic current is caused to flow in said probe means as said probe means scans past a said surface level transition, and detector means connected to said probe means and responsive to a said characteristic current for providing an output indication representative of the detection of a said surface level transition.

2. Apparatus as set forth in claim 1, wherein said electric potential establishing means comprises means for establishing an electric charge on at least said reference surface.

3. Apparatus as set forth in claim 2, wherein said electric charge establishing means includes charge depositing means and high voltage direct current supply means connected to said depositing means to provide an electric charge on said reference surface.

4. Apparatus as set forth in claim 1, wherein said characteristic current exhibits a first characteristic as said probe means scans past a said surface level transition directed toward said probe means and a second characteristic as said probe means scans past a said surface level transition directed away from said probe means, said detector means including means responsive to said first and second current characteristics for providing a said output indication in dependence upon the direction of a detected said surface level transition.

5. Apparatus as set forth in claim 4, wherein said detector means includes circuit means for providing a first level signal in response to each said first current characteristic and a second level signal in response to each said second current characteristic.

6. Apparatus as set forth in claim 5, including logic circuit means for decoding a pattern of said first and second level signals developed as said probe means scans a path past a plurality of said surface level transitions to obtain decoded signals representative of the information presented by said surface level transitions.

7. Apparatus as set forth in claim 6, including first means responsive to the first of said level signals exhibiting a particular one of said levels for providing a first signal representative of the detection of the surface level transition defining the lead edge of said information carrying member.

8. Apparatus as set forth in claim 7, wherein said first means includes means for controlling said first signal to exhibit a first time duration.

9. Apparatus as set forth in claim 7, wherein said logic circuit means includes gate means for activating said logic means to respond to said level signals for a time duration corresponding with said first time duration.

10. Apparatus for electrically reading an information carrying member constructed of electrical insulating material and having information carried on at least one side thereof and defined by surface level transitions from a reference surface on said one side and comprising:

a support member having an electrically conductive surface for supporting a said information carrying member with said one side thereof facing in an opposite direction from said electrically conductive surface;

means for establishing an electric surface charge on at least said reference surface on said one side of said member;

electrically conductive probe means positioned proximate to but spaced from said conductive surface by a distance sufficient to be spaced from said one side of said member when said member is interposed between conductive surface and said probe means, means for imparting relative movement between said probe means and a said supported information carrying member so that said probe means scans along a path corresponding to but spaced from said one side of said information carrying member such that a characteristic electric current is caused to flow in said probe means and exhibiting a binary nature of one binary level and a second binary respectively dependent upon whether said probe is scanning past a surface level transition in a first direction or a second direction relative to said probe means, and binary level decoding means for providing an output representation of the information represented by said surface level transition in dependence upon the binary levels of said characteristic currents.

11. A method of reading an information carrying member having information on at least one side thereof and defined by surface level transitions from a reference surface on said one side and comprising the steps of establishing an electric potential on said reference surface, including establishing direct contact between a resilient conductive member connected to a source of high voltage direct current and said reference surface and then imparting relative movement therebetween while establishing frictional contact between a portion of the surface area of said resilient member and said reference surface so as to transfer an electric charge from said member to said reference surface, detecting a said characteristic current, by means of an electrically conducting probe and providing an output indication in dependence upon said detection.

12. A method for reading an information carrying member having information on at least one side thereof and defined by surface level transitions from a reference surface on said one side and wherein said member is constructed of electrically resistive material comprising the steps of:

placing said member on an electrically conductive support plate with said one side facing away from said support plate;

establishing an electrical potential on said support plate;

establishing an electric charge on said one side of said member on at least said reference surface thereof by an electrode means moving across the surface for establishing a flow of current to set up an electrical potential on said reference surface; and scanning said one side of said member with an electrically conductive probe facing said one side and traversing a path generally parallel to but spaced from said reference surface so that a characteristic current is caused to flow in said probe with the characteristic current exhibiting a first binary level as said probe traverses past a said surface level transition in one direction with respect to the probe and a second binary level as said probe traverses past a surface level transition in the opposite direction; and detecting said binary level currents and providing output indications representative of the directions of the surface level transitions relative to said probe dependent upon the said binary levels of said characteristic current.

13. A method of reading information carrying member having information on at least one side thereof and defined by surface level transitions from a reference surface on said one side and wherein said member is constructed of electrical insulating material and comprising the steps of:

placing said member so as to be supported by a support member having an electrically conductive surface being electrically referenced to a reference potential and with said one side of said member facing in a direction opposite from said electrically conductive surface, establishing an electric surface charge along a path on at least said reference surface of said one side by passing an electrode means over the path for establishing a flow of current to set up an electric potential on said reference surface.

scanning said one side of said member with an electrically conductive probe along a path corresponding with said charge path with said probe being spaced from said reference surface and facing said one side so that as said probe scans along said path a characteristic current is caused to flow in said probe such that the characteristic current exhibits a first binary level and said probe traverses past a surface level transition directed toward the probe and of a second binary level as said probe traverses past said surface level transition directed away from said probe, and utilizing said binary level signals for providing an output indication as to the information represented by said surface level transitions on said one side of said information carrying member.

14. Apparatus for electrically reading an information carrying member having information on at least one side thereof and defined by surface level transitions from a reference surface on said one side and comprising:

corona electrode charger means spaced from said one side of said member for establishing a flow of current to set up an electric potential charge on said one side as the charger means is moved relative to said one side;

electrically conductive probe means positioned proximate to and spaced from said reference surface;

means for imparting relative movement between said probe means and said member such that said probe means scans along a path spaced from said reference surface so that a characteristic current is caused to flow in said probe means as said probe means scans past a said surface level transition, and detector means connected to said probe means and responsive to a said characteristic current for providing an output indication representative of the detection of said surface level transition.

15. Apparatus as set forth in claim 14, wherein said electric charge establishing means includes conductive means electrically connected to said supply means and having one end thereof adapted to make frictional and electrical contact with said surface so that movement of said conductive means along said surface provides transfer of electric charge thereto.

16. Apparatus as set forth in claim 15, wherein said conductive means exhibits sufficient resiliency to enable it to make substantial surface area contact with said surface.

17. Apparatus as set forth in claim 16, including a conductive member positioned on the opposite side of said information on carrying member, and means for establishing a reference potential on said conductive member.

18. Apparatus as set forth in claim 15, wherein said conductive member is a support plate for supporting said information member when positioned with its said one side facing in an opposite direction from said support plate.

19. A method of reading an information carrying member having information on at least one side thereof and defined by surface level transitions from a reference surface on said one side and comprising the steps of establishing an electric charge on said reference surface including moving a corona charging means, connected to a source of high voltage direct current, along a scan path spaced from said reference surface so as to ionize the space therebetween and deposit an electric charge on said reference surface along a path on said reference surface corresponding with the scan path of said corona charging means, providing an electrically conductive probe and positioning said probe at a location proximate to but spaced from said reference surface, imparting relative movement between said probe and said member so that said probe scans along a path spaced from said reference surface such that a characteristic current is caused to flow in said probe as it traverses past a said surface level transition, detecting a said characteristic current, and providing an output indication in dependence upon said detection.

* * * * *